United States Patent [19]

Hühne et al.

[11] 4,139,241
[45] Feb. 13, 1979

[54] ENDLESS TRACK

[75] Inventors: Gerd Hühne, Mörsch; Hans-Peter Stolz, Ettlingen, both of Fed. Rep. of Germany

[73] Assignee: Ing. Ludwig Pietzsch, Karlsruhe, Fed. Rep. of Germany

[21] Appl. No.: 757,329

[22] Filed: Jan. 6, 1977

[51] Int. Cl.² .................. B62D 55/20; B62D 55/28
[52] U.S. Cl. .................... 305/51; 305/58 R; 305/58 PC
[58] Field of Search ............ 305/35 R, 58 R, 58 PC, 305/56, 59, 36, 42, 39, 51, 46, 60, 10

[56] References Cited

U.S. PATENT DOCUMENTS

| 2,283,936 | 5/1942 | Knox | 305/42 |
| 2,536,064 | 1/1951 | Knox | 305/59 |
| 2,686,697 | 8/1954 | Baker | 305/35 R |
| 3,591,242 | 7/1971 | Borner | 305/59 X |
| 3,993,366 | 11/1976 | Orpana | 305/42 X |

FOREIGN PATENT DOCUMENTS 46341 2/1936 France ..................... 305/51

*Primary Examiner*—John P. Shannon
*Attorney, Agent, or Firm*—Lawrence E. Laubscher

[57] ABSTRACT

An endless track having chain links which comprise tubular bodies connected by connector links to the adjacent chain links, as seen in the direction of movement, is widened by at least one further tubular body and one further connector link, all tubular bodies and connector links preferably being of uniform basic dimension.

6 Claims, 8 Drawing Figures

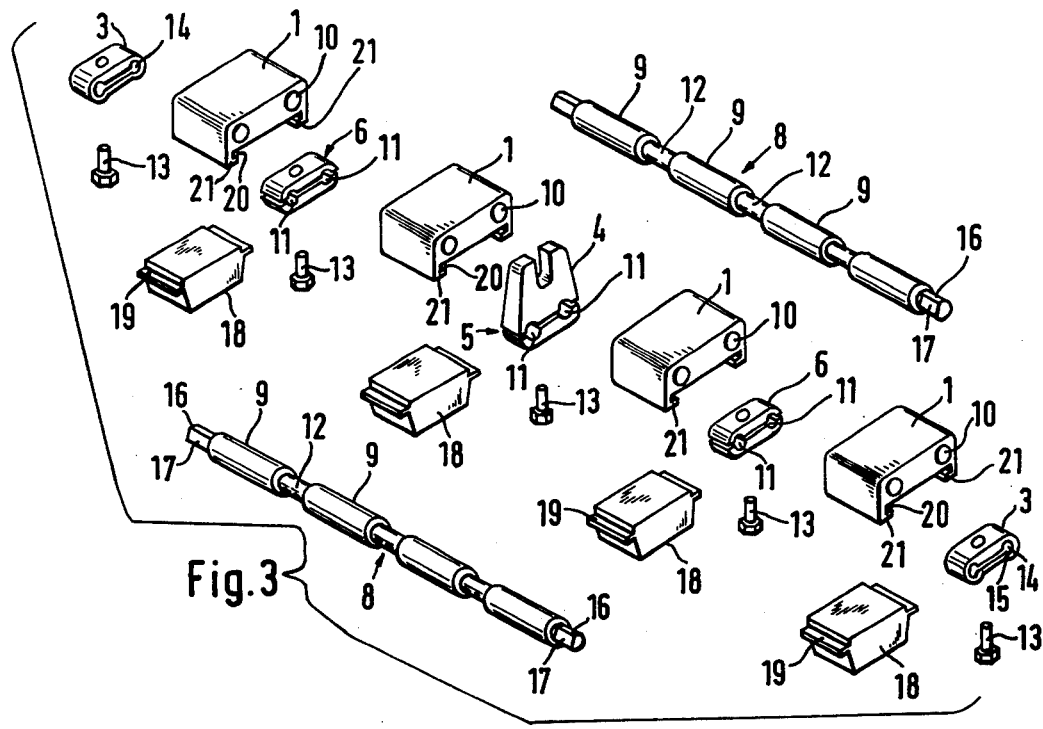
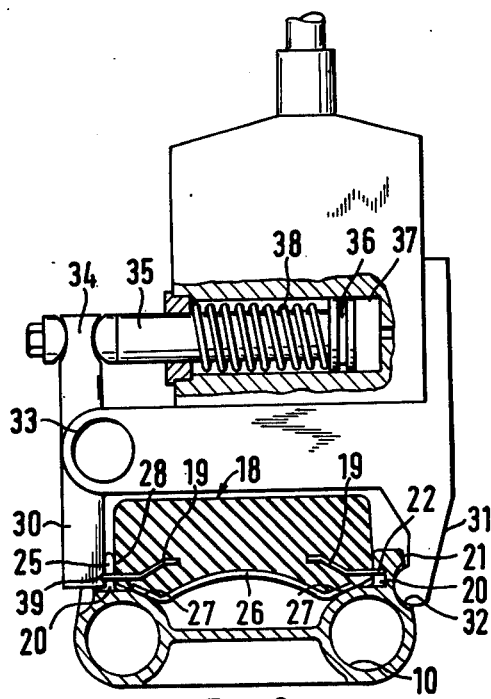
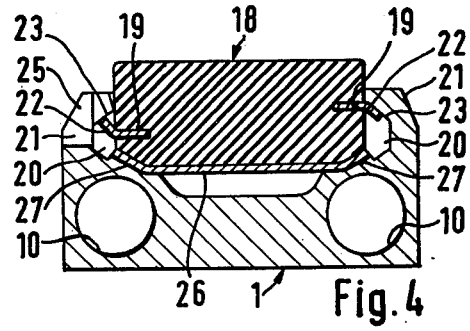
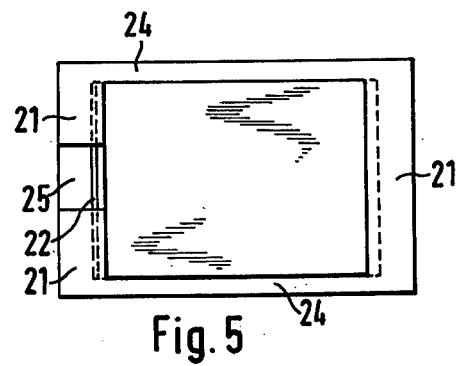

ENDLESS TRACK

BRIEF DESCRIPTION OF THE PRIOR ART

The instant invention relates to an endless track, the chain links of which comprise tubular bodies connected by connector links to the adjacent chain links, as seen in the direction of movement.

In practice chains or tracks of different widths are needed, wide chains being required, for instance, for transmitting greater loads or obtaining higher bearing capacity on slippery ground.

With known endless tracks which normally comprise two tubular bodies and three connector links the structural elements, in particular the tubular bodies, are enlarged according to the pantograph principle in order to render the chain wider, without changing the number of structural elements. It seems that this kind of widening the chains has become customary for the following reasons:

Assembly and storage expenditure appears to be no higher for the wider chain than for the narrower chain since the number of parts required in both cases is the same.

Enlarging the tubular bodies necessarily also provides an enlargement of the roll-off face of the tubular bodies for the wider tread rollers corresponding to the wider chain.

In fact, however, manufacture and storage of spare parts are very expensive because for every chain width all the essential structural elements, in particular the tubular bodies must be manufactured separately and kept in store.

SUMMARY OF THE INVENTION

Therefore, it is the principal object of the present invention to design an endless track of the kind described initially in such manner that it can be made available in different widths at less expenditure than possible before.

It is another object of the invention to provide for widening of the endless track by simply using rods adapted in length to the desired width.

Yet another object of the invention resides in providing a wider roll-off surface for the tread rollers in accordance with the wider chain.

It is also an object of the invention to facilitate the assembly of the running pads on the tubular bodies.

It is, therefore, provided in accordance with the invention that for widening the endless track each chain link comprises at least one further tubular body and one further connector link, all tubular bodies having the same width and tubular bodies and connector links preferably having uniform basic dimensions.

The invention, on purpose, puts up with a greater number of parts for wider chains. And yet the expenditure for manufacture and storage and spare parts is decisively reduced because the structural elements required to make chains of any desired width on principle are the same. Thus, the number of structural elements of different size used with the invention is much smaller than with the conventional methods of widening endless tracks. This is a very favorable aspect for standardization.

The invention is applicable especially to endless tracks of the kind having the connector links connected to the tubular bodies and to the adjacent chain links, in running direction, by means of rods which extend approximately across the width of the chain, i.e., the so-called connector link chain. The only measure needed to enlarge this type of chain is to use rods of a length adapted to the desired chain width. The tubular bodies and connector links can be used unaltered for different chain widths.

An advantageous modification of the invention provides that the intermediate connector links, arranged between two tubular bodies each of a chain link, and the tubular bodies have flush surfaces at the inner side of the chain serving as support faces for the chain wheels or tread rollers so as to obtain a wider roll-off surface for the tread rollers in accordance with the greater chain width. The overall roll-off surface may be enlarged additionally by providing the intermediate connector links with areas which extend transversely of the direction of movement of the chain between adjacent tubular bodies, as seen in running direction, and carry additional roll-off surfaces for the chain wheels flush with the surfaces mentioned and/or by providing the tubular bodies with webs which extend into the space between two adjacent intermediate connector links, as seen in running direction, and carry additional roll-off surfaces for the chain wheels flush with the surfaces mentioned. This embodiment of the invention also affords smoother running as compared to chains which are enlarged in conventional manner.

Another reason why the two tubular bodies per chain link so far were enlarged according to the pantograph principle, when chains were to be made wider, may have been the kind of connection employed between the normally used running pads and the tubular bodies. This usual connection was established by laterally pushing the running pads which had projecting legs into grooves in the tubular bodies (German patent 1,206,325). In the case of endless tracks composed of chain links having more than two tubular bodies this implies high assembly costs since the outer tubular bodies must be completely removed to offer access to the inner tubular bodies for assembly of the running pads.

With the invention this difficulty is overcome in that the running pads are adapted to be mounted on the tubular bodies vertically with respect to the running surface of the chain. In a specific example of this preferred embodiment of the invention this is achieved by resilient retainer elements extending away from two opposed sides of the running pads and capable of becoming snap-locked by their free ends in recesses formed under claw-type projections of the tubular bodies. The claw-type projections, advantageously, are located at the outer side of the tubular bodies facing the running pad and are disposed transversely of the running direction of the chain and face each other and, at the lateral ends, the recesses are closed by webs so that the running pads can be removed and installed in a direction vertical to the tubular bodies, without any necessity for dismantling the chain links. The exchange of the running pads thus is considerably facilitated and accelerated.

Assembly and disassembly of the running pad on and from the tubular body conveniently is effected by means of a device which grips a free end of a resilient retainer element and the tubular body in the manner of tongs. To this end one of the claw-type projections may have a slot through which the device can cooperate with the respective resilient retainer element.

In another modified embodiment of the invention, with an uneven number of tubular bodies belonging to a chain link, the central tubular body carries the chain tooth for lateral guidance of the vehicle. This is an advantage over the fixing of the chain tooth on the rod employed so far which caused corrosion by friction.

Apart from the advantages already mentioned the invention provides the following further important advantages:

The rod is less subjected to bending stress by the chain traction because instead of three connector links, used so far, the chain traction is now being transmitted by at least four connector links. Moreover, the bending stress of the rod by the tread roller is reduced because also the connector links help to transmit the tread roller pressure and, with an uneven number of tubular bodies, the central tubular body supports the bolt. This reduced load on the rods permits the use of rods having smaller diameters so that also the structural elements connected by the rods may be smaller. This offers savings in material and weight.

Wear of the running pads is reduced by the type of connection of the running pad with the tubular body because, when the tread roller rolls off from one chain link to the next, the running pads do not give way as much as before.

BRIEF DESCRIPTION OF THE DRAWING

In order that the invention may be clearly understood and readily carried into effect several preferred embodiments thereof will now be described by way of example with reference to the accompanying drawings, in which:

FIG. 3 is an exploded view of the structural elements of the connector link chain shown in FIG. 2, FIG. 4 is a sectional view of a first embodiment of a tubular body with a running pad inserted, FIG. 5 is a top plan view of the tubular body shown in FIG. 4, FIG. 6 is a sectional view of a modified tubular body with running pad, also showing an assembly device for assembly and disassembly of the running pad at the tubular body.

DETAILED DESCRIPTION

Figure 1:
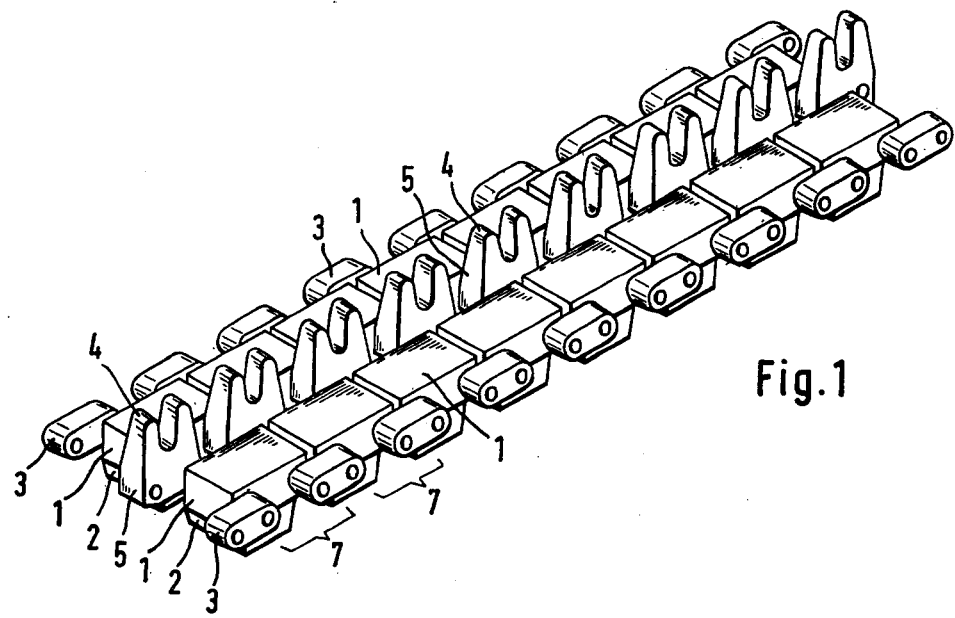
FIGS. 1 and 2 are diagrammatic top plan views of pieces of connector link chains made from structural elements according to the invention.
Figure 2:
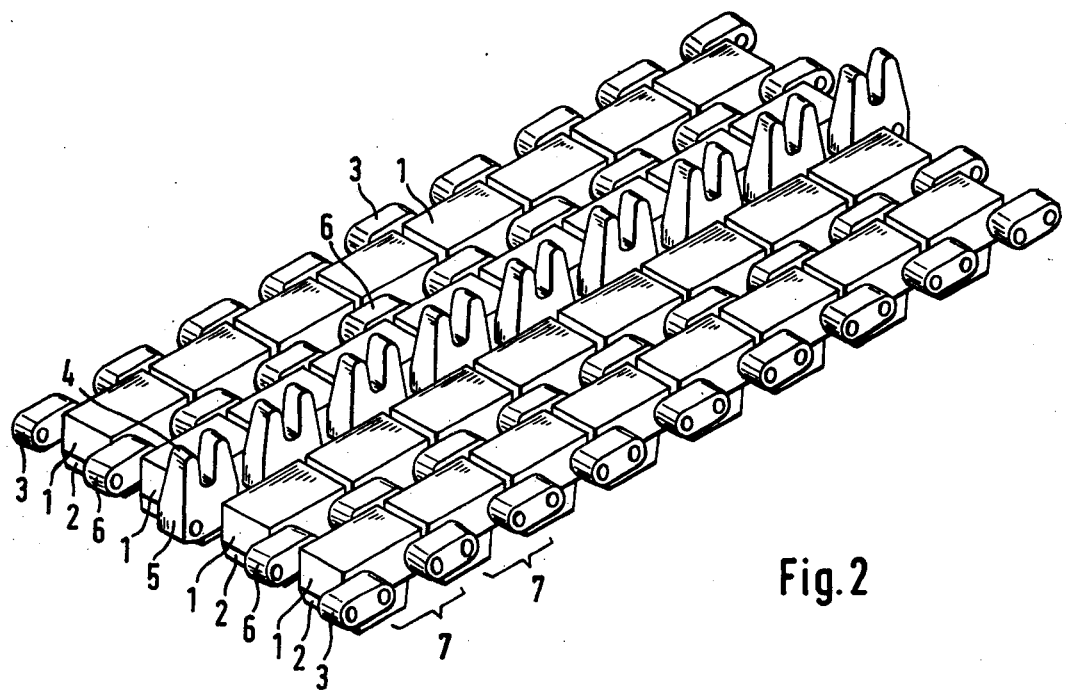

FIGS. 1 and 2 show two connector link chains of different widths composed of structural elements according to FIG. 3. The chain shown in FIG. 2 is approximately twice as wide as the chain to be seen in FIG. 1. While each chain link of the embodiment shown in FIG. 1 comprises two tubular bodies 1 with running pads 2, two end connectors 3 and one intermediate connector 5 carrying the chain tooth 4, FIG. 2 shows each chain link to comprise four tubular bodies 1 with running pads 2 and, in addition to the central intermediate connector 5 with the chain tooth 4, two further intermediate connectors 6. At the inside of the chain facing the tread rollers the intermediate connectors 6 are designed flush with the tubular bodies. Hereby they increase the roll-off surface for the tread rollers which is mainly provided by the tubular bodies.

Each chain link generally designated 7 is connected to the following chain link 7 through connector links 3, 5, and, if desired, 6 by means of rods 8 which extend through the connector links and the tubular bodies and are to be seen in FIG. 3.

Rubber sleeves 9 corresponding in number and length to the number and width of the tubular bodies 1 are fixed on each rod by vulcanization and are of oversize as compared to through bores 10 in tubular bodies 1. The rods together with the rubber sleeves 9 are pressed into these through bores 10. As the rubber sleeves can be twisted the rods 8 are capable of tilting in through bores 10 by the angle required for return of the chain. (FIG. 3)

The intermediate connector links 6 are of bi-partite design. Their halves form recesses 11 to receive bolt sections 12 located between the sleeve sections 9. The two halves of the intermediate connector links can be interconnected in such manner by clamping bolts 13 that one recess 11 each can be tightly clamped to a rod section 12 of a rod and the other recess 11 to a rod section 12 of the adjacent rod of the successive chain link 7. The intermediate connector link 5 in the center likewise has the recesses 11 already mentioned and differs from intermediate connector links 6 only in that its upper part is designed as a chain tooth 4. The end connector links 3 are shown undivided in the drawings, yet preferably they are also of bi-partite design as the intermediate connector links 6. The end connector links 3 are provided with recesses 14 having flat sections 15. These recesses 14 and their flat sections 15 are complementary to pin-like ends 16 of the rods provided with corresponding flat sections 17. Hereby rods 8 are fixed against rotation to connector links 3, 5, and if desired, 6 and capable of swinging together with the same with respect to the tubular bodies 1 in order to permit chain return movement.

As will be described in detail in connection with FIGS. 4–6, running pads 18 having retainer elements 19 which extend from two sides of the same can be pressed into recesses 20 under opposed claw-type projections 21 of the tubular bodies 1 from the outside, i.e., from the tread surface side of the chain in a direction vertical to the chain.

Thus, it has been shown that the structural elements described permit the production of chain links with any desired even number of tubular bodies in graduated widths. The only measure required is the use of bolts of a length adapted to the desired chain width and having a number of sleeve sections 9 which corresponds to the desired number of tubular bodies.

It will now be described with reference to two embodiments shown in FIGS. 4–6 how the connection is made between the running pads 18 and the tubular bodies 1. For the sake of clarity elements having the same function as in FIGS. 1–3 are designated by the same reference numerals.

The embodiment according to FIGS. 4 and 5 has resilient retainer elements 19 of resilient angular sheet material fixed by vulcanization in two sides of the running pad 18. The retainer elements 19 are offset in height in the running pad. The right retainer element, as seen in FIG. 4, has a section 22 bent at a downward angle outside of the running pad 18, whereas the outer, bent section 22 of the left retainer element is bent upwards. At these end sections 22 retainer elements 19 engage under the upper inclined walls 23 of recesses 20 under claw-like projections 21. Contrary to the illustration of FIG. 3 these recesses are not continuous but instead limited at the ends by webs 24 so that the running pad 18 is also secured against lateral displacement in tubular body 1.

A slot 25 for assembly and disassembly is provided in the left projection 21, as seen in FIGS. 4 and 5. Through this slot an assembly device can engage the left retainer element 19. When assembled, running pad 18 is supported on the shoulders 27 of tubular body 1 by means of a plate 26 fixed by vulcanization.

Assembly and dissambly will be described with reference to the preferred embodiment of running pad and tubular body according to FIG. 6 which also shows an assembly device 29. The embodiment illustrated in FIG. 6 mainly differs by the fact that the retainer elements 19 are symmetrically fixed by vulcanization in the running pad and that their outwardly extending sections 22 are not bent at an angle. The projections 21 of the tubular body, designed as a casting, are adapted accordingly. The assembly device comprises two jams 30, 31 of which jaw 30 engages the left retainer element 19, as seen in FIG. 6, through the slot 25, while jaw 31 engages in a recess 32 at the outside of the right projection 21, as seen in FIG. 6. The jaws 30, 31 are connected to each other for pivoting movement about a pivot point 33. A rod 35 is pivoted to the free end 34 of jaw 30. This rod 35 is integral with a piston 36 which is adapted to be displaced hydraulically or pneumatically in a cylinder 37 against the action of a spring 38. For assembly the right retainer element 19, as seen in FIG. 6, is inserted into the recess 20 under the right projection 21. Then the assembly device 29 is applied in the manner described to this projection 21 and to the free end section 22 of the retainer element 19 which is still above the left projection. The application of hydraulic pressure will then pivot jaw 30 so that the free end section 22 is pressed past the inner edge 28 of the left projection, taking along the running pad to the tubular body, until the free end section 22 of the retainer element 19 becomes released upon entering into the recess 20. Spring 38 functions to separate the assembly device from the retainer element 19. In assembled condition the running pad 18 again rests on shoulders 27 of the tubular body by way of a plate 26 and is also prevented from displacement in a direction vertical to the plane of the drawing relative to the tubular body by lateral webs corresponding to webs 24 of FIG. 5 but not shown in FIG. 6. For disassembly the sequence of the steps is reversed, the jaw 30 being brought into engagement with the free end section of the retainer element through slot 25. A firmer grip of the jaw on this free end section 22 can be obtained by providing a corresponding recess 39 in the jaw to receive the free end section.

Figure 7:
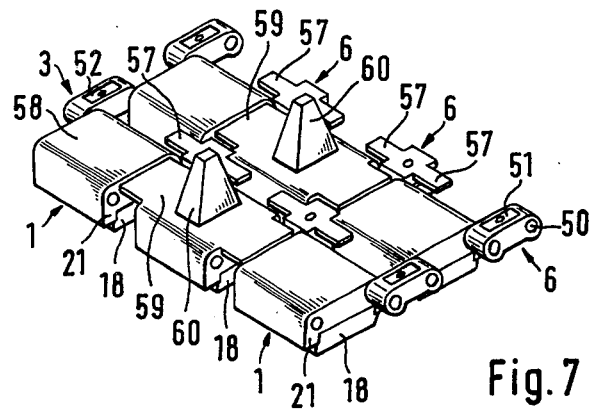
FIG. 7 is a perspective view of the inner side of a piece of chain of a connector link chain, showing two chain links.

The embodiment shown in FIG. 7 comprises a connector link chain with three tubular bodies per chain link. The structural elements are shown in detail in FIG. 8. Structural elements having the same function are provided with the same reference numerals as in FIGS. 1-6 even if they are modified in design.

Figure 8:
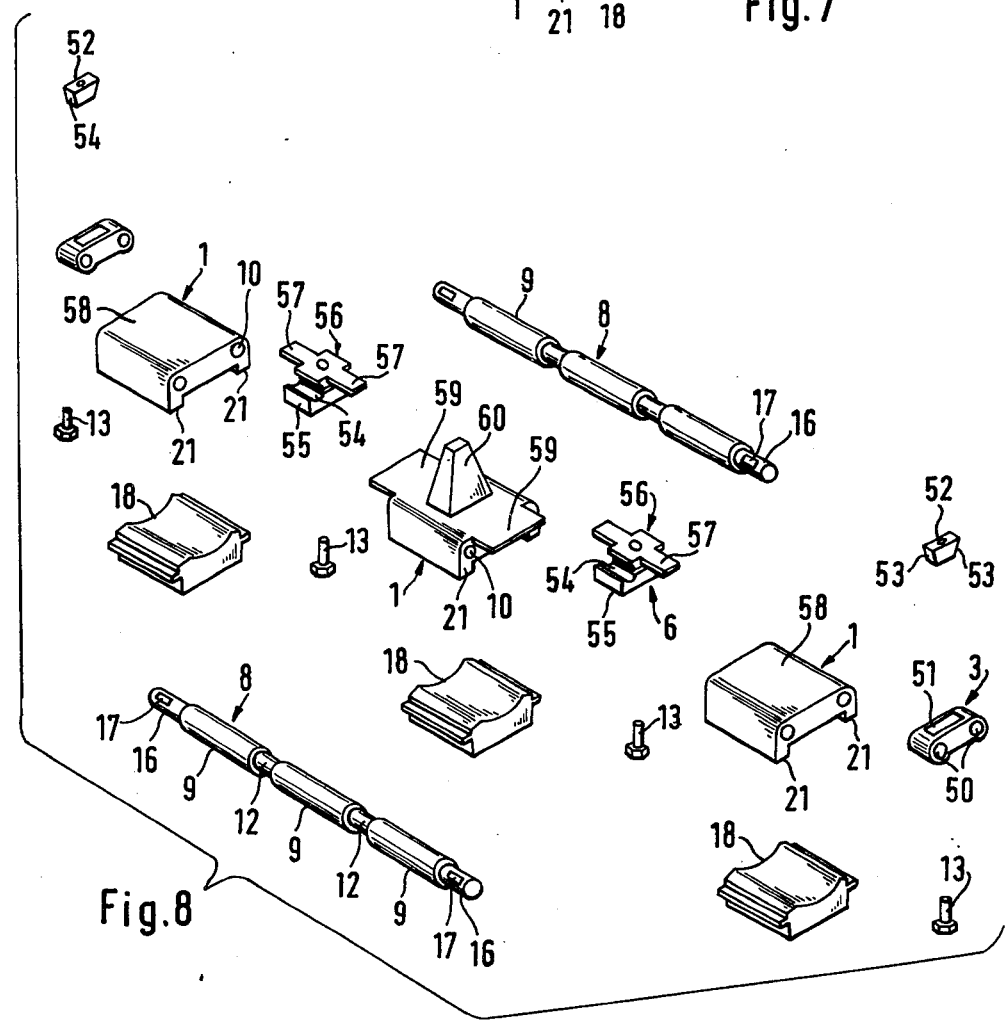
FIG. 8 is an exploded view of the structural elements of the connector link chain shown in FIG. 7.

On principle the tubular bodies 1 of the connector link chain according to FIGS. 7 and 8 are of the same structure as the tubular bodies according to FIGS. 1-6. They comprise through bores 10 spaced from each other for the bolts 8, and they are provided at the running surface with opposed projections 21 for assembly of running pads 18, as described with reference to FIGS. 4 to 6. Also rods 8 on principle are of the same structure as in the embodiment illustrated in FIGS. 1-3, with the exception of the flat sections which are arranged spaced from the radial bolt end faces of the pin-like ends. Hereby the pin-like ends 16 are adapted to the end connector links 3 which have round through bores 50 for the ends 16 of the bolts. These through bores 50 are intersected by a wedge-shaped recess 51 into which fits a wedge 52. In assembled condition wedge 52 is clamped, by its wedge surfaces 53, against the flat sections 17 by means of a bolt 13 so as to obtain a connection which is fixed against rotation between the end connector links 3 and the ends 16 of the rods. As is the case with the embodiment according to FIGS. 1-3, the intermediate connector links 6 are produced in two separate parts 55 and 56 and likewise adapted to be clamped on the rods by bolts 13. The two parts 55, 56 define recesses 54 which, in assembled condition, surround approximately three quarters of the total circumference of the rod sections 12. The part 56 facing the tread roller comprises areas 57 which extend transversely of the running direction of the chain between adjacent tubular bodies 1, as seen in running direction, and form a surface which is flush with the roll-off face 58 of tubular bodies 1 facing the tread rollers. Webs 59 extending away from two sides of the central tubular body 1 in a direction transversely of the running direction have a surface which faces the tread rollers and is likewise flush with the surface mentioned. The central tubular body carries a chain tooth 60 on its upper side.

It shows that in the assembled condition according to FIG. 7 the areas 57 and the webs 59 together with the roll-off face 58 of the tubular body constitute a very large roll-off surface for the tread rollers.

It is readily obvious that also chains having a greater uneven number of tubular bodies per chain link can be composed, in accordance with the desired chain width, from structural elements according to FIG. 8 upon corresponding multiplication. If a chain having an even number of tubular bodies per chain link is to be made from structural elements according to FIG. 8, the central tubular body provided with the chain tooth 60 is to be replaced by an intermediate connector link which carries a chain tooth. The design including webs 59 at the tubular bodies is applicable regardless of whether the number of tubular bodies 1 is even or uneven.

The present embodiments are to be considered as in all respects illustrative and not restrictive, the scope of the invention being indicated by the appended claims.

What is claimed is:
1. An endless track, comprising
   (a) a plurality of chain links each including a plurality of tubular bodies arranged transversely of the direction of travel of the track, said tubular bodies having at their forward and rear ends aligned openings extending transversely of the link;
   (b) rod members extending through said aligned openings, respectively;
   (c) means including a plurality of connector links connecting the forward end of one chain link with the trailing end of a preceding chain link, at least some of said connector links being intermediate connector links arranged between said tubular bodies, respectively, said connector links being mounted at their forward and rear ends on the rods associated with the rear and forward ends, respectively, of said tubular bodies;
   (d) a plurality of running pads arranged beneath said tubular bodies, respectively, when the chain link is positioned for engagement with a horizontal supporting surface; and (e) vertically operable snap-fit locking means connecting each running pad with the associated tubular body, said snap-fit locking means including resilient retainer elements extending generally horizontally from opposed surfaces of each of said running pads, said retainer elements being snap-fit into locking engagement with a pair of claw-like projections defined, respectively, on the opposing wall portions of a corresponding recess contained in said tubular body member, one of said claw-like projections containing a slot for receiving one jaw of an assembly tool for engagement with the corresponding retainer element during the snap-fit connection between said running pad and said tubular body.

2. Apparatus as defined in claim 1, wherein the external surface of the other of said claw-like projections contains a depression for receiving a portion of a second jaw of said assembly tool.

3. An endless track of relatively wide width, comprising (a) a plurality of chain links each including a plurality of tubular bodies arranged transversely of the direction of travel of the track, said tubular bodies having at their forward and rear ends aligned openings extending transversely of the link;

(b) rod members extending through said aligned openings, respectively; and (c) means including a plurality of connector links connecting the forward end of one chain link with the trailing end of a preceding chain link, at least some of said connector links being intermediate connector links arranged between said tubular bodies, respectively, said connector links being mounted at their forward and rear ends on the rods associated with the rear and forward ends, respectively, of said tubular bodies;

(d) said intermediate connector links and said tubular bodies having on the inner peripheral surface of the endless track coplanar first roll-off surfaces (57, 58), whereby said roll-off surfaces are adapted to support chain link wheels associated with the endless track;

(e) at least the center one of three successive transversely arranged tubular bodies including on opposite sides thereof laterally extending web portions (59) that extend toward, and terminate at their free extremities adjacent, the adjacent tubular bodies, respectively, said web portions including second roll-off surfaces parallel with said first roll-off surfaces, respectively.

4. Apparatus as defined in claim 3, wherein the chain link includes an uneven number of tubular bodies, the central one of said tubular bodies including thereon a chain tooth.

5. Apparatus as defined in claim 3, wherein each of said tubular bodies comprises a casting.

6. Apparatus as defined in claim 3, and further including a plurality of running pads arranged adjacent the lower surfaces of the tubular bodies, respectively, when the chain link is in a horizontal surface engaging position, and connecting means operable upon vertical displacement of each of said running pads relative to the associated tubular body for connecting said running pad to said tubular body.

* * * * *